(12) United States Patent
Ota et al.

(10) Patent No.: US 10,323,303 B2
(45) Date of Patent: Jun. 18, 2019

(54) ELECTRODE MATERIAL AND ELECTRODE FOR IGNITION PLUG, AND IGNITION PLUG

(71) Applicants: Sumitomo Electric Industries, Ltd., Osaka-shi, Osaka (JP); DENSO CORPORATION, Kariya-shi, Aichi-ken (JP)

(72) Inventors: Hajime Ota, Osaka (JP); Kazuo Yamazaki, Osaka (JP); Naoki Sugihara, Osaka (JP); Nobuo Abe, Kariya (JP)

(73) Assignees: Sumitomo Electric Industries, Ltd., Osaka-shi, Osaka (JP); DENSO CORPORATION, Kariya-shi, Aichi-ken (JP)

( * ) Notice: Subject to any disclaimer, the term of this patent is extended or adjusted under 35 U.S.C. 154(b) by 0 days.

(21) Appl. No.: 15/771,670

(22) PCT Filed: Oct. 31, 2016

(86) PCT No.: PCT/JP2016/082336
§ 371 (c)(1),
(2) Date: Apr. 27, 2018

(87) PCT Pub. No.: WO2017/077984
PCT Pub. Date: May 11, 2017

(65) Prior Publication Data
US 2018/0363102 A1    Dec. 20, 2018

(30) Foreign Application Priority Data
Nov. 2, 2015   (JP) .................................. 2015-215580

(51) Int. Cl.
*H01T 13/39*   (2006.01)
*C22F 1/10*   (2006.01)
*C22C 19/05*   (2006.01)
*F02P 15/00*   (2006.01)
*G01M 15/04*   (2006.01)

(52) U.S. Cl.
CPC ............ *C22C 19/057* (2013.01); *C22C 19/05* (2013.01); *C22C 19/058* (2013.01); *C22F 1/10* (2013.01); *F02P 15/00* (2013.01); *G01M 15/042* (2013.01); *H01T 13/39* (2013.01)

(58) Field of Classification Search
USPC .................................................... 123/169 EL
See application file for complete search history.

(56) References Cited

U.S. PATENT DOCUMENTS

| | | | | |
|---|---|---|---|---|
| 2003/0122462 | A1* | 7/2003 | Nishikawa | ............. H01T 13/38 313/143 |
| 2006/0170320 | A1* | 8/2006 | Kumagai | ............... H01T 13/39 313/141 |
| 2008/0308057 | A1* | 12/2008 | Lykowski | .......... B23K 35/3066 123/169 EL |
| 2010/0013371 | A1* | 1/2010 | Nakai | ..................... H01J 9/022 313/491 |
| 2012/0013241 | A1 | 1/2012 | Shibata et al. | |
| 2012/0293061 | A1 | 11/2012 | Tanaka et al. | |
| 2014/0370258 | A1 | 12/2014 | Ota et al. | |
| 2015/0017729 | A1 | 1/2015 | Ota et al. | |
| 2016/0032425 | A1* | 2/2016 | Hattendorf | ........... C22C 19/057 420/443 |

FOREIGN PATENT DOCUMENTS

| | | |
|---|---|---|
| JP | 2006-316343 A | 11/2006 |
| JP | 2009/521778 A | 6/2009 |
| JP | 2013-178220 A | 9/2013 |
| JP | 2014-29002 A | 2/2014 |
| WO | WO 2007/062352 A2 | 5/2007 |
| WO | WO 2011/077619 A1 | 6/2011 |
| WO | WO 2012/056598 A1 | 5/2012 |

OTHER PUBLICATIONS

JP Office Action dated Nov. 5, 2018 from corresponding Japanese patent application No. 2015-215580 (with attached English-language translation).

* cited by examiner

*Primary Examiner* — Ashok Patel
(74) *Attorney, Agent, or Firm* — Drinker Biddle & Reath LLP

(57) ABSTRACT

An electrode material is composed of at least 0.2 mass % and at most 1.0 mass % of Y, at least 0 mass % and at most 0.2 mass % of Al, at least 0.2 mass % and at most 1.6 mass % of Si, at least 0.05 mass % and at most 1.0 mass % of Cr, at least 0.05 mass % and at most 0.5 mass % of Ti, at least 0.1 mass % and at most 0.5 mass in total of one or more elements selected from among Yb, Sb, Ir, Zr, Hf, Pt, Re, Pd, Rh, Ru, Nb, V, W, Mo, and Ta, and a remainder composed of Ni and an inevitable impurity.

9 Claims, No Drawings

ELECTRODE MATERIAL AND ELECTRODE FOR IGNITION PLUG, AND IGNITION PLUG

TECHNICAL FIELD

The present invention relates to an electrode material, an electrode for an ignition plug, and an ignition plug. The present application claims priority to Japanese Application No. 2015-215580 filed on Nov. 2, 2015, the entire contents of which are herein incorporated by reference.

BACKGROUND ART

Examples of engine components for a car include an ignition plug (a spark plug). A nickel alloy has conventionally been used for an electrode of the ignition plug as disclosed in Japanese Patent Laying-Open No. 2014-029002 (PTD 1) and Japanese Patent Laying-Open No. 2013-178220 (PTD 2).

PTDs 1 and 2 disclose the possibility of corrosion of an electrode of an ignition plug by a corrosive liquid produced due to idling stop. PTD 1 discloses an electrode material composed of a nickel alloy of a specific composition in order to retard corrosion.

CITATION LIST

Patent Document

PTD 1: Japanese Patent Laying-Open No. 2014-029002
PTD 2: Japanese Patent Laying-Open No. 2013-178220

SUMMARY OF INVENTION

An electrode material according to one manner of the present invention contains at least 0.2 mass % and at most 1.0 mass % of Y, at least 0 mass % and at most 0.2 mass % of Al, at least 0.2 mass % and at most 1.6 mass % of Si, at least 0.05 mass and at most 1.0 mass % of Cr, at least 0.05 mass % and at most 0.5 mass % of Ti, at least 0.1 mass % and at most 0.5 mass % in total of one or more elements selected from among Yb, Sb, Ir, Zr, Hf, Pt, Re, Pd, Rh, Ru, Nb, V, W, Mo, and Ta, and a remainder composed of Ni and an inevitable impurity.

DETAILED DESCRIPTION

Problem to be Solved by the Present Disclosure

An electrode of an ignition plug equipped in an engine of a car is desirably high in corrosion resistance when it is kept in an environment of use of a relatively low-temperature and low-oxidative atmosphere for a long time. An electrode material with which an electrode for an ignition plug high in corrosion resistance in such a relatively low-temperature and low-oxidative atmosphere is obtained is desired.

For measures for environmental preservation, recently, a hybrid vehicle equipped with an engine and a motor has been used, and idling stop or exhaust gas recirculation (EGR) has been carried out in an engine vehicle. During running with a motor of a hybrid vehicle or during idling stop of an engine vehicle, a temperature of an electrode of an ignition plug becomes lower as the engine is turned off. When a period for which the engine is turned off is longer, the electrode of the ignition plug is kept at a relatively low temperature (for example, around 800° C.) When running with the motor or idling stop described above is intermittently repeated, the electrode of the ignition plug is intermittently kept at a relatively low temperature and a total period of time for which the electrode is held in such a state is longer. The electrode of the ignition plug equipped in the engine of the car may thus be maintained at a relatively low temperature for a long period of time.

An atmosphere in an engine of a car is normally lower (lower than 20 volume %) in concentration of oxygen than the ambient atmosphere. When EGR is carried out, the concentration of oxygen tends to be further lower. Therefore, the electrode of the ignition plug equipped in the engine of the car can be concluded to be exposed to the low-oxidative atmosphere for a long period of time.

The electrode of the ignition plug may be used in an environment of use of the relatively low-temperature and low-oxidative atmosphere as described above for a period of time long to some extent. It has been found that a conventional electrode or electrode material cannot be concluded to be high in corrosion resistance when it is used in an environment of use of such a relatively low-temperature and low-oxidative atmosphere (see a first test example which will be described later).

One object of the present invention is to provide an electrode material with which an electrode for an ignition plug high in corrosion resistance in a relatively low-temperature and low-oxidative atmosphere can be obtained.

Another object of the present invention is to provide an electrode for an ignition plug high in corrosion resistance in a relatively low-temperature and low-oxidative atmosphere and an ignition plug including the electrode for the ignition plug.

Advantageous Effect of the Present Disclosure

An electrode for an ignition plug high in corrosion resistance in a relatively low-temperature and low-oxidative atmosphere can be composed of the electrode material in the present invention.

[Description Of Embodiments]

The present inventors have studied an electrode for an ignition plug and an electrode material suitable for an environment of use of a relatively low-temperature and low-oxidative atmosphere described above (which may hereinafter be called a low-temperature and low-oxidative condition) and consequently obtained findings below. If Si is contained within a specific range, an oxide film can be formed even under the low-temperature and low-oxidative condition and the oxide film can lessen introduction of a corrosive liquid or introduction of oxygen into the inside. If Y is contained within a specific range, crystals can be refined and a total grain boundary length is longer, and hence introduction of a corrosive liquid or introduction of oxygen into the inside can be lessened. Corrosion resistance can be enhanced owing to a synergistic effect of formation of such an oxide film and refinement of crystals. In particular, by containing within a specific range, a specific auxiliary element which forms a compound or a eutectic with Y which will be described later, Y can exist in an alloy in a more uniform and dispersed manner and an effect of refinement of crystals can be enhanced. Based on the findings above, the present invention defines an electrode material composed of a nickel alloy of a specific composition. Contents of an embodiment of the present invention will initially be listed and described.

(1) An electrode material according to the embodiment contains at least 0.2 mass % and at most 1.0 mass % of Y, at least 0 mass % and at most 0.2 mass % of Al, at least 0.2 mass % and at most 1.6 mass % of Si, at least 0.05 mass % and at most 1.0 mass % of Cr, at least 0.05 mass % and at most 0.5 mass % of Ti, at least 0.1 mass % and at most 0.5 mass % in total of one or more elements selected from among Yb, Sb, Ir, Zr, Hf, Pt, Re, Pd, Rh, Ru, Nb, V, W, Mo, and Ta, and a remainder composed of Ni and an inevitable impurity.

Since the electrode material is composed of a nickel alloy of a specific composition, it is made use of for an electrode of an ignition plug, and the electrode material is high in corrosion resistance when it is used in an environment of use of the low-temperature and low-oxidative condition described above. Specifically, the following may be applicable.

(a) Since Si higher in effect of suppression of oxidation than Al is contained within a specific range, an oxide film can be formed on a surface even under the low-temperature and low-oxidative condition. This subsequently formed oxide film can lessen introduction of a corrosive liquid and introduction of oxygen through a surface into the inside and can suppress internal corrosion and internal oxidation. When Cr and Ti are contained within a specific range, further suppression of internal oxidation can be expected.

(b) Since Y is contained within a specific range, crystals can be refined and a total grain boundary length can be increased. Consequently, introduction of a corrosive liquid and introduction of oxygen through surface into the inside can be lessened and internal corrosion and internal oxidation can be suppressed.

(c) Ti and one or more elements selected from among Yb, Sb, Ir, Zr, Hf, Pt, Re, Pd, Rh, Ru, Nb, V, W, Mo, and Ta (which are hereinafter called auxiliary elements) are elements which form a compound (mainly an intermetallic compound) or a eutectic with Y, and some of them may also form a compound with Ni. By containing such an element within a specific range, Y can form a compound or a eutectic with an auxiliary element in addition to an intermetallic compound with Ni, and Y can exist in an alloy in a more uniform and dispersed manner. An effect of refinement of crystals can be enhanced owing to a pinning effect of the compound or the eutectic containing Y which exists in a dispersed manner.

According to (a) to (c), internal oxidation can be suppressed, generation of a crack in an oxide film or peel-off of an oxide film due to excessive increase in thickness of the oxide film caused by progress of internal oxidation tends to be lessened, and an oxide film of an appropriate thickness can satisfactorily be maintained. Therefore, it is expected that an effect of suppression of internal corrosion achieved by providing the oxide film can more satisfactorily be obtained and high corrosion resistance can be maintained for a long period of time.

By setting a content of a specific element described above to be within a specific range, the electrode material can suppress increase in specific resistance, can lessen wear by sparks, and is excellent also in spark wear resistance. By making use of such an electrode material, an electrode for an ignition plug excellent not only in corrosion resistance in an environment of use of a low-temperature and low-oxidative condition but also in spark wear resistance is obtained.

(2) The electrode material further contains at least 0.05 mass % and at most 0.5 mass % of Mn by way of example. The electrode material contains at least 0.2 mass % and at most 1.0 mass % of Y, at least 0 mass % and at most 0.2 mass % of Al, at least 0.2 mass % and at most 1.6 mass % of Si, at least 0.05 mass % and at most 1.0 mass % of Cr, at least 0.05 mass % and at most 0.5 mass % of Ti, at least 0.05 mass % and at most 0.5 mass % of Mn, at least 0.1 mass % and at most 0.5 mass % in total of one or more elements selected from among Yb, Sb, Ir, Zr, Hf, Pt, Re, Pd, Rh, Ru, Nb, V, W, Mo, and Ta, and a remainder composed of Ni and an inevitable impurity.

Since this embodiment contains Mn within a specific range, internal oxidation tends to further be suppressed and sufficiently satisfactory corrosion resistance can be achieved owing to provision of the oxide film.

(3) The electrode material contains more than 0.3 mass % of Y by way of example.

Since this embodiment contains more Y, an effect of refinement of crystals is enhanced and corrosion resistance is further enhanced.

(4) The electrode material contains Yb by way of example.

Yb forms a compound with Y and also forms a compound with Ni. As a result of a pinning effect of such a compound, this embodiment can achieve the enhanced effect of refinement of crystals and can be higher in corrosion resistance.

(5) The electrode material satisfies a condition of Si/Cr being not lower than 1 (Si/Cr≥1) with Si/Cr representing a mass ratio of a content of Si to a content of Cr by way of example.

This embodiment is higher in corrosion resistance because the oxide film itself formed during use as an electrode of an ignition plug is high in corrosion resistance. The oxide film tends to have a two-layered structure of a surface oxide layer located on a surface side and an internal oxide layer located on an inner side which is closer to a substrate composed of a nickel alloy. The internal oxide layer tends to be greater in amount of Ni than the surface oxide layer due to its proximity to the substrate, and is prone to corrosion and poor in corrosion resistance. Therefore, it is considered that the internal oxide layer is preferably small in thickness to some extent. The embodiment satisfying the condition of Si/Cr ≥1 achieves denseness and robustness during use as an electrode of an ignition plug, and an oxide film relatively small in thickness of the internal oxide layer tends to formed. Since such an oxide film is high in corrosion resistance, the embodiment is high in corrosion resistance.

(6) The electrode material has a specific resistance at a room temperature not higher than 25 μΩ·cm by way of example. This embodiment is low in specific resistance and excellent in spark wear resistance.

(7) By way of example, when the electrode material is heated at 900° C. for 100 hours, the heated electrode material has an average crystal grain size not greater than 80 μm.

The heating condition above can be concluded to simulate such a condition that the electrode material is maintained for a long period of time at approximately 900° C. during use as an electrode of an ignition plug. This embodiment can be concluded to be able to maintain such a condition that an average crystal grain size is small because crystal grains are less likely to grow (less likely to be coarse). Therefore, the embodiment can maintain such a condition that a total grain boundary length is long even when the electrode material is exposed for a long period of time to an environment around 900° C. for use as an electrode of an ignition plug. Even though a temperature is thereafter lowered and a corrosive liquid is produced, the corrosive liquid is less likely to be introduced into the inside. Corrosion is less likely and corrosion resistance is excellent.

(8) By way of example, when the electrode material is heated at 900° C. for 100 hours, the heated electrode material has an oxide film formed on its surface. The oxide film has a two-layered structure of an internal oxide layer and a surface oxide layer and a ratio of a thickness of the surface oxide layer to a thickness of the internal oxide layer (which is hereinafter called a thickness ratio) is lower than 1.5.

The heating condition above can be concluded to simulate such a condition that the electrode material is maintained for a long period of time at approximately 900° C. during use as an electrode of an ignition plug. In this embodiment, it can be concluded that an oxide film of which thickness ratio satisfies the specific range in this case is present. The oxide film has an appropriate thickness (details of which will be described later) with neither of the internal oxide layer and the surface oxide layer being excessively large in thickness, and the oxide film is less likely to suffer from a crack and peel-off. Therefore, the embodiment can sufficiently be satisfactory in corrosion resistance owing to provision of the oxide film.

(9) An electrode for an ignition plug according to the embodiment is composed of the electrode material according to any one of (1) to (8).

Since the electrode for the ignition plug is composed of the electrode material of the specific composition described above, it is high in corrosion resistance even though an environment of use is in a low-temperature and low-oxidative condition due to running with a motor of a hybrid vehicle incorporating an engine and the motor or idling stop or EGR of a general engine vehicle. Since the electrode for the ignition plug is composed of the electrode material of the specific composition described above, it is also excellent in spark wear resistance.

(10) An ignition plug according to the embodiment includes the electrode for the ignition plug according to (9).

Since the ignition plug includes the electrode for the ignition plug composed of the electrode material of the specific composition described above, it is high in corrosion resistance even though an environment of use is in a low-temperature and low-oxidative condition due to running with a motor of a hybrid vehicle incorporating an engine and the motor or idling stop or EGR of a general engine vehicle. Since the ignition plug includes the electrode for the ignition plug, it is also excellent in spark wear resistance and hence it is expected to be able to maintain a satisfactory state of use for a long period.

[Details Of Embodiment Of The Present Invention]

An electrode material, an electrode for an ignition plug, and an ignition plug according to the embodiment of the present invention will sequentially be described below in detail. A content of an element is expressed in mass % unless otherwise specified.

Electrode Material

Composition

An electrode material in the embodiment is composed of a nickel alloy containing Y, Si, Cr, Ti, and a specific auxiliary element as additive elements and a remainder composed of Ni and an inevitable impurity. In addition to the additive elements, the electrode material can contain at least one of Al and Mn.

By containing Ni as a main component, specifically by setting an amount of Ni to at least 95%, or further to at least 96% or at least 97%, plastic workability is excellent, a specific resistance is low (a conductivity is high), and spark wear resistance is excellent for use as an electrode of an ignition plug. As an amount of Ni is greater, a specific resistance can further be lowered, and as a content of additive elements is higher, corrosion resistance tends to be enhanced.

Y (Yttrium)

Y is present as a compound (mainly an intermetallic compound) or a eutectic. The electrode material in the embodiment suppresses growth of crystals and has a fine crystal structure owing to what is called a pinning effect of such a compound or eutectic. As crystals are refined and refined crystals are maintained, introduction of a corrosive liquid or introduction of oxygen into the inside can be lessened and internal corrosion or internal oxidation can be suppressed. In particular, the electrode material in the embodiment contains a specific auxiliary element which will be described later. Therefore, in addition to an intermetallic compound containing Y and Ni, an intermetallic compound containing Y and a specific auxiliary element or a eutectic containing Y and a specific auxiliary element is present. Consequently, Y uniformly exists in an alloy, and thus a further refined crystal structure or a uniformly refined crystal structure is achieved. Though existence of a part of Y as a solid solution with Ni is acceptable, existence of Y as a compound or a eutectic as described above is preferred because a refinement effect is sufficiently obtained.

As an amount of Y is greater, crystals are readily refined and increase in total grain boundary length is expected. Therefore, an amount of Y is not lower than 0.2%. In consideration of improvement in effect of refinement of crystals, an amount of Y is higher than 0.3% and further preferably not lower than 0.35%. When an amount of Y is small to some extent, such effects as (1) less likeliness of increase in specific resistance, suppression of thermal degradation of an electrode due to increase in specific resistance, and excellent spark wear resistance and (2) suppression of lowering in plastic workability, high workability of an electrode into a prescribed shape, and excellent manufacturability of an electrode are achieved. Therefore, an amount of Y is not higher than 1.0%. In consideration of satisfactory spark wear resistance and plastic workability, an amount of Y is preferably not higher than 0.75% and further preferably not higher than 0.7%.

Auxiliary Element

V (vanadium), Zr (zirconium), Nb (niobium), Mo (molybdenum), Ru (ruthenium), Rh (rhodium), Pd (palladium), Sb (antimony), Hf (hafnium), Ta (tantalum), W (tungsten), Re (rhenium), Ir (iridium), Pt (platinum), and Yb (ytterbium) are present as forming a compound (an intermetallic compound) or a eutectic with Y, and contribute to enhancement of the effect of refinement of crystals owing to uniform dispersion of Y. The present inventors have studied addition of an element which can contribute to more uniform dispersion in an alloy of Y effective for refinement of crystals. Consequently, the present inventors have obtained findings that Y is more readily present as being uniformly dispersed in an alloy by containing an element which forms a compound or eutectic with Y rather than an element which totally forms a solid solution with Y. The present inventors have also obtained findings that Y is more readily present as being more uniformly dispersed by containing an element which forms a compound with Ni rather than an element which forms a solid solution with Ni. The electrode material in the embodiment contains a specific element (an auxiliary element) as the additive element. Table 1 shows categorization of auxiliary elements.

TABLE 1

| Relation with Y | Relation with Ni | |
|---|---|---|
| | Compound with Ni | Solid Solution with Ni |
| Compound with Y | — | (Group β)<br>Ir, Sb, Pt, Re, Pd, Rh, Ru |
| Eutectic with Y | (Group α)<br>Yb, Hf, (Ti) | (Group γ)<br>Zr, Nb, V, W, Mo, Ta |

An element in a group α forms a eutectic with Y and forms a compound with Ni.

An element in a group β forms a compound with Y and forms a solid solution with Ni.

An element in a group γ forms a eutectic with Y and forms a solid solution with Ni.

In an embodiment containing an element in group α, at least one of the auxiliary elements forms a eutectic containing Y and is uniformly present together with Y in an alloy from such a state that it forms a solid solution with Ni and is uniformly present in a matrix, which contributes to an effect of refinement of crystals. Remaining auxiliary elements mainly form a compound with Ni and are present as a compound in the alloy together with Ni, so that the effect of refinement of crystals is further readily enhanced. Ti also forms a eutectic with Y similarly to an element in group α and forms also a compound with Ni, which contributes to refinement of crystals.

In an embodiment containing an element in group β, at least one of auxiliary elements forms a compound containing Y and is uniformly present together with Y in an alloy from such a state that it forms a solid solution with Ni and is uniformly present in a matrix, which contributes to the effect of refinement of crystals. The remainder is present as forming a solid solution with Ni.

In an embodiment containing an element in group γ, at least one of auxiliary elements forms a eutectic containing Y and is uniformly present together with Y in an alloy from such a state that it forms a solid solution with Ni and is uniformly present in a matrix, which contributes to the effect of refinement of crystals. The remainder is present as forming a solid solution with Ni.

As a content of an auxiliary element is higher, enhancement of the effect of refinement of crystals owing to a compound or a eutectic with Y is expected. Therefore, the content is not lower than 0.1%. In consideration of enhancement of the effect of refinement of crystals, a content of the auxiliary element is preferably not lower than 0.13% and further preferably not lower than 0.15%. When a content of the auxiliary element is low to some extent, suppression of increase in specific resistance and suppression of lowering in plastic workability can be expected. Therefore, the content is not higher than 0.5%. In consideration of satisfactory spark wear resistance and plastic workability, a content of the auxiliary element is preferably not higher than 0.45% and further preferably not higher than 0.4%.

An embodiment containing only one type of element selected from the listed group of auxiliary elements or an embodiment containing two or more types of elements selected from the listed group of auxiliary elements (an embodiment containing a plurality of types of elements) can be adopted. In the embodiment containing a plurality of types of auxiliary elements, a total content preferably satisfies the range described above (not lower than 0.1% and not higher than 0.5%). When an element in group α in the listed group of auxiliary elements is contained, an effect to enhance refinement of crystals tends to be obtained. In particular, Yb is preferably contained.

Si (Silicon)

Si is an element high in effect of suppression of oxidation. By containing Si, an oxide (an oxide film) containing Si can subsequently be generated on a surface of an electrode during use as an electrode of an ignition plug. The oxide film can lessen introduction of a corrosive liquid into the inside of the electrode to thereby suppress corrosion by the corrosive liquid. In addition, the oxide film can lessen introduction of oxygen into the inside of the electrode to thereby suppress internal oxidation. Owing to suppression of internal oxidation, a dense oxide film excellent in adhesiveness can be generated. Furthermore, an internal oxide layer is not excessively large in thickness. Generation of a crack, rupture, or peel-off (becoming porous) due to increase in thickness is suppressed and an oxide film having an appropriate thickness can be maintained. Therefore, contribution also to improvement in corrosion resistance can be achieved.

As an amount of Si is greater, the effect of suppression of oxidation owing to formation of the oxide film is readily achieved and hence the amount of Si is not lower than 0.2% In consideration of the effect of suppression of oxidation, the amount of Si is preferably not lower than 0.3% and further preferably not lower than 0.4%. When the amount of Si is excessively large, the oxide film becomes a porous film large in thickness or lowering in spark wear resistance is caused due to increase in specific resistance. Therefore, the amount of Si is not higher than 1.6%. In consideration of maintaining of an appropriate oxide film and suppression of increase in specific resistance, the amount of Si is preferably not higher than 1.5%, not higher than 1.3%, and not higher than 1%.

By simultaneously containing Si and Al which will be described later and Cr and Mn which will be described later, generation of particles of a compound containing nickel can be suppressed during use as an electrode of an ignition plug. Therefore, it is less likely that an ignition state becomes unstable due to particles of a compound or the engine is damaged by particles of a compound which come off, and hence a stable ignition state tends to be maintained.

Al (Aluminum)

Al is an element high in effect of suppression of oxidation, and the effect of suppression of oxidation can further be enhanced by containing also Al together with Si.

An excessively large amount of Al leads to damage by increase in thickness of the oxide film or increase in specific resistance described above. Therefore, when Al is contained, the amount of Al is preferably not lower than 0.005% and not higher than 0.2%, not lower than 0.01% and not higher than 0.15%, and more preferably not lower than 0.03% and not higher than 0.1%. Since the electrode material in the embodiment requires Si higher in effect of suppression of oxidation than Al as an essential element, it is permitted to contain no Al (the amount of Al is 0%).

Cr (Chromium)

Cr is excellent in resistance to a corrosive liquid, and in addition, effective also for suppressing internal oxidation. Cr is also expected to achieve an effect of suppression of generation of particles of a compound described above by being contained together with Si. Cr is less likely to increase a specific resistance than Al, and it tends to be higher in effect of suppression of generation of particles of a compound than Mn which will be described later. The electrode material in the embodiment requires Cr as an essential element and optionally contains Al and Mn as an additive element.

As an amount of Cr is greater, such an effect of corrosion resistance, suppression of internal oxidation, and suppression of generation and growth of particles of a compound described above tends to be achieved. An amount of Cr is thus not lower than 0.05%. In consideration of these effects, the amount of Cr is preferably not lower than 0.1% and further preferably not lower than 0.15%. An excessively large amount of Cr leads to lowering in spark wear resistance due to increase in specific resistance. Therefore, the amount of Cr is preferably not higher than 1.0%. In consideration of suppression of increase in specific resistance, the amount of Cr is not higher than 0.9% and further preferably not higher than 0.8%.

Ti (Titanium)

Ti is effective in refining crystals by forming a eutectic with Y or forming a compound with Ni similarly to the elements in group α, described above, and contributes to suppression of internal corrosion and internal oxidation. Ti can suppress generation of a nitride of Al (AlN) when Al is contained. Consequently, damage to an oxide film such as generation of a crack in the oxide film due to generation of Al nitride in the oxide film is suppressed and contribution to maintaining of the oxide film is achieved.

As an amount of Ti is greater, an effect of refinement of crystals tends to be obtained. Ti is thus not lower than 0.05%. In consideration of the effect of refinement of crystals, the amount of Ti is preferably not lower than 0.08% and further preferably not lower than 0.1%. An excessively large amount of Ti leads to lowering in spark wear resistance due to increase in specific resistance and hence the amount of Ti is not higher than 0.5%. In consideration of suppression of increase in specific resistance, the amount of Ti is preferably not higher than 0.4% and further preferably not higher than 0.3%.

Mn (Manganese)

Mn is effective for suppression of internal oxidation. Mn is also expected to achieve the effect of suppression of generation of particles of a compound described above by being contained together with Si and Al. An excessively large amount of Mn leads to increase in specific resistance. Therefore, when Mn is contained, the amount of Mn is preferably not lower than 0.05% and not higher than 0.5%, not lower than 0.05% and not higher than 0.4%, and more preferably not lower than 0.05% and not higher than 0.3%.

Si/Cr ≥1

In addition to such a condition that an amount of Si and an amount of Cr satisfy the specific ranges described above, a mass ratio Si/Cr of a content of Si to a content of Cr preferably satisfies 1 or more. When such a condition that the amount of Si is equal to or greater than the amount of Cr is satisfied, internal oxidation in particular can effectively be suppressed by containing both of Si and Cr and an oxide film which is dense and highly adhesive and includes an internal oxide layer relatively small in thickness can be generated for use as an electrode of an ignition plug. Such an oxide film is readily maintained. By including such an oxide film, corrosion by a corrosive liquid is less likely and corrosion resistance is excellent. As the mass ratio Si/Cr is higher, corrosion resistance tends to be high. Conditions of Si/Cr >1, 1.3≤Si/Cr≤32, 1.3≤Si/Cr ≤10, and 2≤Si/Cr≤6 are further exemplified.

Other Elements

More than 0% and at most 0.05% or at least 0.001% and at most 0.02% of boron (B) can be contained. In this case, hot workability is excellent and the electrode material in the embodiment or the electrode for the ignition plug in the embodiment is readily manufactured.

More than 0% and at most 0.05% of carbon (C) can be contained. In this case, strength at a high temperature can be enhanced while workability is ensured.

Structure

By being composed of the specific composition described above, the electrode material in the embodiment can maintain a state that crystals are fine even though it is held around 900° C. for a long period of time. Specifically, the electrode material in the embodiment satisfies such a condition that an average crystal grain size thereof after being heated at 900° C. for 100 hours is not greater than 80 μm. An electrode of an ignition plug composed of such an electrode material can maintain a fine crystal structure as described above. Therefore, introduction of a corrosive liquid or introduction of oxygen into the inside can be suppressed and excellent corrosion resistance and resistance to oxidation are achieved. Depending on a content of an additive element described above, the average crystal grain size can be not greater than 75 μm, not greater than 70 μm, and not greater than 50 μm. As the average crystal grain size is smaller, a total grain boundary length of crystals is longer and internal corrosion or internal oxidation is more readily suppressed. Therefore, no lower limit is set. A heating condition will be described in an oxidation test later.

Specific Resistance

The electrode material in the embodiment is low in specific resistance by being composed of the specific composition described above. For example, a specific resistance at a room temperature (representatively around 20° C.) satisfies a condition of 25 μΩ·cm or lower. A specific resistance is representatively varied depending on whether a content of an additive element is high or low, and the specific resistance tends to be lower as the content is lower. Depending on a composition, the specific resistance can satisfy a condition of 20 μΩ·cm or lower or 15μΩ·cm or lower. As the specific resistance is lower, spark wear resistance tends to be higher. Therefore, no lower limit is set. As a content of an additive element is lower to be closer to pure nickel, a specific resistance is lower whereas corrosion resistance and resistance to oxidation are poorer.

State of Formation of Oxide Film

When the electrode material in the embodiment composed of the specific composition described above is held around 900° C. for a long period of time, an oxide film having a specific structure and thickness may be present. Specifically, after the electrode material in the embodiment is heated at 900° C. for 100 hours, an oxide film having a two-layered structure of an internal oxide layer and a surface oxide layer is formed on a surface thereof and a ratio (a thickness ratio) of a thickness of the surface oxide layer to a thickness of the internal oxide layer satisfies a condition of less than 1.5. The electrode material in the embodiment is less likely to suffer from internal oxidation as described above and hence a thickness of the internal oxide layer can be concluded to be relatively small. When the thickness ratio is lower than 1.5, the surface oxide layer is merely 1.5 time as thick as the internal oxide layer small in thickness. Such an oxide film is not excessively large in thickness and can be concluded to be less likely to suffer from a crack and peel-off and to readily be maintained in a sound state. When the electrode material in the embodiment is made use of for an electrode of an ignition plug, an oxide film of such an appropriate thickness can be formed and can satisfactorily be maintained. Therefore, this electrode is high in corrosion resistance. A heating condition and a method of measuring a thickness will be described in the oxidation test later.

An electrode material or an electrode for an ignition plug including the oxide film which satisfies the thickness ratio can be obtained. In this case, satisfactory corrosion resistance owing to provision of the oxide film can be achieved from an early stage of use as the electrode of the ignition plug. The oxide film can also be provided only in a desired region of the electrode.

Shape

A representative shape of the electrode material in the embodiment includes a wire subjected to plastic working including wiredrawing. Examples of a cross-sectional shape include various shapes such as a rectangular shape and an annular shape. A size of a cross-section or a diameter of a wire can also be selected as appropriate. For example, a wire having a rectangular cross-section has a thickness approximately not smaller than 1 mm and not greater than 3 mm and a width approximately not smaller than 2 mm and not greater than 4 mm. A round wire having an annular cross-section has a diameter approximately not smaller than 2 mm and not greater than 6 mm.

Method of Manufacturing Electrode Material

The electrode material in the embodiment can representatively be manufactured in steps of melting→casting→hot rolling→cold wiredrawing and heat treatment. An atmosphere during melting or casting is set to an atmosphere lower in concentration of oxygen than the ambient atmosphere, such as a low-oxygen atmosphere in which a concentration of oxygen is not higher than 10 volume %. Then, oxidation of Y can be suppressed, and oxidation of Yb can also be suppressed when Yb is contained. A compound or a eutectic containing Y or a compound containing Y and Yb can sufficiently be present in the electrode material.

Final heat treatment after cold wiredrawing can enhance workability owing to softening, so that the electrode material is readily worked into a prescribed electrode shape and working strain introduced during plastic working such as wiredrawing can be removed to lower a specific resistance. Conditions in final heat treatment include a heating temperature not lower than 700° C. and not higher than 1000° C. and preferably approximately not lower than 800° C. and not higher than 950° C. and a non-oxidizing atmosphere. Examples of the non-oxidizing atmosphere include an atmosphere in which a concentration of oxygen is low such as a hydrogen atmosphere or a nitrogen atmosphere (in which a concentration of oxygen is, for example, not higher than 10 volume %) or an atmosphere containing substantially no oxygen.

A shape of the wire can be changed by rolling after cold wiredrawing. For example, a shape can be changed from an annular cross-sectional shape to a rectangular cross-sectional shape. Final heat treatment described above can be performed after rolling.

In manufacturing an electrode material including an oxide film satisfying the specific thickness ratio described above, heat treatment (oxidation treatment) for forming the oxide film is performed after cold wiredrawing, rolling, or final heat treatment described above. Conditions for oxidation treatment in batch treatment include a heating temperature not lower than 800° C. and not higher than 1100° C. and preferably not lower than 900° C. and not higher than 1000° C. and an atmosphere containing oxygen such as the ambient atmosphere. Oxidation treatment can be continuous with the use of a current feed type heating furnace or an atmosphere furnace.

Electrode for Ignition Plug

The electrode for the ignition plug in the embodiment is composed of the electrode material in the embodiment described above and can be made use of as a central electrode or a ground electrode equipped in the ignition plug or both of them. The electrode for the ignition plug in the embodiment can be manufactured by cutting the electrode material in the embodiment described above to an appropriate length or forming the cut material further into a prescribed shape. A specific oxide film can be provided as described above. The electrode for the ignition plug in the embodiment substantially maintains characteristics and properties such as a composition, a structure, and a specific resistance of the electrode material in the embodiment described above.

Ignition Plug

The ignition plug in the embodiment includes the electrode for the ignition plug described above and can be made use of as an ignition component in an engine or the like of a car. The ignition plug representatively includes an insulator, main hardware which holds the insulator, a central electrode held in the insulator and having a part protruding from a tip end of the insulator, a ground electrode having one end welded to a surface of the main hardware on a tip end side and having the other end provided as being opposed to an end surface of the central electrode, and terminal hardware provided at a rear end of the insulator.

Primary Effect of Embodiment

The electrode material in the embodiment is composed of a specific composition. In particular by containing an auxiliary element, the electrode material can satisfactorily maintain a fine crystal structure owing to enhancement by Y of the effect of refinement of crystals and can satisfactorily have and maintain an appropriate oxide film by containing Si or the like. Therefore, the electrode material in the embodiment is high in corrosion resistance to a corrosive liquid when it is held for a certain period of time in a relatively low-temperature and low-oxidative atmosphere. Details of the effect will be described in a first test example.

By being composed of the electrode material in the embodiment, the electrode for the ignition plug in the embodiment is less likely to be corroded by a corrosive liquid and high in corrosion resistance even though it is in such an environment of use as being held in a relatively low-temperature and low-oxidative atmosphere for a certain period of time. The ignition plug in the embodiment includes the electrode for the ignition plug in the embodiment composed of the electrode material in the embodiment, so that the electrode is less likely to be corroded by a corrosive liquid and high in corrosion resistance even in the environment of use above.

[First Test Example]

An electrode material composed of a nickel alloy and a plurality of electrodes made of the electrode material were fabricated and characteristics thereof were evaluated.

The electrode material (wire) was fabricated as below.

A melt of a nickel alloy composed as shown in Table 2 was prepared by using a common vacuum melting furnace. A composition is expressed in mass %. "Si/Cr" is expressed in mass ratio and an "impurity" represents an inevitable impurity.

Commercially available pure Ni (at least 99.0 mass % of Ni) and grains of each additive element were employed as source materials for the melt. The melt was purified to reduce or remove an impurity or an inclusion. An amount of C was set to 0.05 mass % or lower by adjusting a degree of purification. Melting was carried out with an atmosphere being controlled to lower a concentration of oxygen.

Vacuum casting was performed with a temperature of the melt being adjusted as appropriate, to thereby obtain an ingot.

TABLE 2

| Sample No. | Composition (Mass %) | | | | | | | | |
|---|---|---|---|---|---|---|---|---|---|
| | Y | Auxiliary Element | Si | Cr | Mn | Al | Ti | Remainder | Si/Cr |
| 1-1 | 0.42 | Ir | 0.2 | 0.2 | 0.2 | 0 | 0 | 0.10 | Ni + Impurity | 1 |
| 1-2 | 0.45 | Zr | 0.2 | 0.2 | 0.2 | 0 | 0 | 0.10 | Ni + Impurity | 1 |
| 1-3 | 0.38 | Sb | 0.2 | 0.2 | 0.2 | 0 | 0 | 0.10 | Ni + Impurity | 1 |
| 1-4 | 0.48 | Yb | 0.18 | 0.2 | 0.2 | 0 | 0 | 0.10 | Ni + Impurity | 1 |
| 1-5 | 0.44 | Yb | 0.19 | 0.46 | 0.2 | 0 | 0 | 0.10 | Ni + Impurity | 2.3 |
| 1-6 | 0.46 | Yb | 0.21 | 0.51 | 0.2 | 0.1 | 0.05 | 0.30 | Ni + Impurity | 2.55 |
| 1-7 | 0.44 | Yb | 0.19 | 0.77 | 0.2 | 0 | 0 | 0.10 | Ni + Impurity | 3.85 |
| 1-8 | 0.45 | Yb | 0.2 | 0.78 | 0.21 | 0.1 | 0.047 | 0.05 | Ni + Impurity | 3.71 |
| 1-9 | 0.42 | Hf | 0.2 | 0.2 | 0.2 | 0 | 0 | 0.10 | Ni + Impurity | 1 |
| 1-10 | 0.45 | Nb | 0.2 | 0.2 | 0.2 | 0 | 0 | 0.10 | Ni + Impurity | 1 |
| 1-101 | 0.27 | — | — | 0.2 | 0.2 | 0 | 0 | 0.10 | Ni + Impurity | 1 |
| 1-102 | 0.35 | — | — | 0.5 | 0.2 | 0 | 0 | 0.10 | Ni + Impurity | 2.5 |
| 1-103 | 0.35 | — | — | 0.5 | 0.2 | 0.1 | 0.05 | 0.10 | Ni + Impurity | 2.5 |
| 1-104 | 0.35 | — | — | 0.8 | 0.2 | 0 | 0 | 0.10 | Ni + Impurity | 4 |
| 1-105 | 0.35 | — | — | 0.8 | 0.2 | 0.1 | 0.05 | 0.10 | Ni + Impurity | 4 |
| 1-106 | 0.35 | — | — | 1.2 | 0.2 | 0 | 0 | 0.10 | Ni + Impurity | 6 |
| 1-107 | 0.27 | Ce | 0.2 | 0.2 | 0.2 | 0 | 0 | 0.10 | Ni + Impurity | 1 |

The obtained ingot was heated again and forged to obtain a billet of approximately 150 mm square. The billet was subjected to hot rolling to thereby obtain a rolled wire having a diameter of 5.5 mm ϕ. The rolled wire was subjected to cold wiredrawing and heat treatment as being combined to thereby obtain a cold wiredrawn material. A round wire having a diameter of 2.5 mm ϕ and a round wire having a diameter of 4.2 mm ϕ were fabricated. The round wire having a diameter of 2.5 mm ϕ was further rolled and deformed to have a rectangular cross-section to thereby obtain a flat wire of 1.5 mm×2.8 mm. The flat wire and the round wire having a diameter of 4.2 mm ϕ were subjected to final heat treatment to obtain a soft material. The soft material was employed as a sample for the electrode material. Final heat treatment was continuous with a heating temperature being selected from among temperatures not lower than 800° C. and not higher than 1000° C. and an atmosphere being set to a non-oxidizing atmosphere (a nitrogen atmosphere or a hydrogen atmosphere).

<Composition>

A composition of the electrode material (the soft material) of each sample was examined with an inductively coupled plasma (ICP) emission spectrophotometer. Then, the composition was the same as the composition shown in Table 2, and the electrode material was composed of an additive element shown in Table 2 and the remainder composed of Ni and an inevitable impurity. An amount of Ni in samples Nos. 1-1 to 1-10 was not lower than 98 mass %. "- (hyphen)" in Table 2 represents a content being lower than a detection limit and substantially no content. The composition can be analyzed also with atomic absorption spectrometry other than ICP emission spectrophotometry.

<Structure>

The electrode material (the soft material) of each sample was observed with a scanning electron microscope (SEM) and examined by being subjected to element analysis with energy dispersive X-ray analysis (EDX) or electron probe microanalysis (EPMA). It could be confirmed that samples Nos. 1-4 to 1-9 each containing an auxiliary element in group α shown in Table 2 contained an intermetallic compound containing Y and Ni, a eutectic containing Y and an auxiliary element, and a compound containing Ni and an auxiliary element, samples Nos. 1-1 and 1-3 each containing an auxiliary element in group β contained an intermetallic compound containing Y and Ni, and an intermetallic compound containing Y and an auxiliary element, and samples Nos. 1-2 and 1-10 each containing an auxiliary element in group γ contained an intermetallic compound containing Y and Ni and a eutectic containing Y and an auxiliary element.

<Specific Resistance>

A specific resistance (μΩ·cm) of the electrode material (the soft material) of each sample was measured. Table 3 shows results. A specific resistance (at a room temperature) was measured with an electrical resistance measurement device with a direct-current four-terminal method (a gauge length GL=100 mm).

<Spark Wear Resistance>

A sample of which specific resistance (at a room temperature) described above was not higher than 25μΩ·cm was evaluated as B as being high in spark wear resistance and a sample of which specific resistance was not higher than 15 μΩ·cm was evaluated as A as being very high in spark wear resistance. Table 3 shows results of evaluation.

<State of Formation of Oxide Film>

The electrode material (the soft material) of each sample was heated to examine a state of formation of an oxide film. An oxidation test below was conducted and a state of formation and a thickness of the oxide film after this test were examined.

(Oxidation Test)

Such an operation to place a sample in an atmosphere furnace increased in temperature to 900° C., heat the sample for one hour, thereafter take the sample out of the atmosphere furnace, air cool the sample for thirty minutes, and heat again the sample for one hour was repeated until a time period for heating reached a total of one hundred hours.

After the oxidation test, a cross-section of the sample was observed with an optical microscope (at a magnification from 50× to 200×), and a thickness of the oxide film formed on the surface of the sample was measured by using a micrograph (photograph). In each sample fabricated in this test, an oxide film having a two-layered structure was formed. Specifically, the oxide film in each sample included the surface oxide layer defining an outermost surface and its vicinity of the oxide film and the internal oxide layer located on an inner side of the surface oxide layer. The surface oxide layer tends to be higher in content of an additive element and lower in content of Ni and the internal oxide layer tends to be higher in content of Ni.

A thickness (μm) of each of the internal oxide layer and the surface oxide layer was measured in this test. A ratio of a thickness of the surface oxide layer to a thickness of the internal oxide layer (a thickness ratio, surface/inside) was found. Table 3 shows results.

An average thickness from a boundary between a substrate region composed of a nickel alloy and the internal oxide layer to a boundary between the internal oxide layer and the surface oxide layer was measured as the thickness of the internal oxide layer. An average thickness from the boundary between the oxide layers described above to the outermost surface of the oxide film was measured as the thickness of the surface oxide layer. The average thickness is readily found by subjecting the micrograph to image processing (see PTD 1).

<Average Crystal Grain Size>

An average crystal grain size (μm) of the electrode material of each sample after the oxidation test described above (900° C.×100 hours) was examined. Table 3 shows results. A cross-section of the sample was observed with an optical microscope (at a magnification from 50× to 200×) and an intersection method (nodal line method) was used for the micrograph (photograph) to thereby calculate an average crystal grain size.

<Corrosion Resistance>

Corrosion resistance of the electrode material (the soft material) of each fabricated sample was examined. A test to reproduce a corroded state below in which the sample was immersed in a corrosive liquid after heat treatment was conducted to evaluate a state of corrosion after the test.

(Corrosion Resistance Test: Test to Reproduce Corroded State)

Heat Treatment Conditions

Low-oxygen atmosphere (a concentration of oxygen being approximately 5 volume %, which was lower than the concentration of oxygen in the ambient atmosphere)

800° C.×24 hours with the use of a heating furnace

Corrosion Conditions

Corrosive liquid nitric acid:phosphoric acid:5 mass % of sodium chloride aqueous solution=5:5:90 at a mass ratio Temperature of corrosive liquid in immersion 80° C.

Time period for which the sample was held as being immersed selected from a range from three hours to fifteen hours Evaluation of Corrosion After the time period for which the sample had been held as being immersed described above elapsed, each sample was washed with water, a cross-section polisher (CP) cross-section was taken, and decrease in cross-sectional area was examined. An amount of decrease (%) in cross-sectional area was found and evaluated in four levels as below. Table 3 shows results of evaluation.

Amount of decrease (%) in cross-sectional area= {(cross-sectional area before corrosion resistance test−cross-sectional area after corrosion resistance test)/cross-sectional area before corrosion resistance test}×100

Amount of decrease not higher than 10%=extremely high in corrosion resistance in a low-temperature and low-oxidative condition: A+

Amount of decrease not lower than more than 10% and not higher than 20%=very high in corrosion resistance in a low-temperature and low-oxidative condition: A Amount of decrease higher than 20% and not higher than 30%=high in corrosion resistance in a low-temperature and low-oxidative condition: B Amount of decrease higher than 30%=poor in corrosion resistance in a low-temperature and low-oxidative condition: C <Engine Test>

The fabricated electrode material (the soft material) was cut to an appropriate length and formed into a prescribed shape as appropriate, to thereby fabricate a ground electrode for an ignition plug (a flat wire of 1.5 mm×2.8 mm being employed) and a central electrode for an ignition plug (a round wire having a diameter of 4.2 mm ϕ being employed) employed in a passenger car in which a common engine was mounted. The ground electrode and the central electrode were defined as samples of the electrode.

The ground electrodes and the central electrodes representing fabricated samples Nos. 1-5, 1-7, and 1-101 were used to fabricate an ignition plug. The ignition plug was attached to an in-line four-cylinder 2.0 L engine and an engine test was conducted. An endurance test as the engine test in which an engine rotation speed was set to 5600 r/min. on an engine bench, ten seconds of full throttle and thirty seconds of idling were defined as one cycle, and oxidation of the electrode was accelerated by repeating this cycle was conducted. After the cycle was repeated until a total period of time reaches ninety hours, a thickness of the sample was measured and variation in thickness before and after the engine test was examined. An amount of wear (%)={(thickness before test−thickness after test)/thickness before test}×100 was calculated. Table 3 shows a result greater in value out of an amount of wear of the ground electrode and an amount of wear of the central electrode. The engine test can be concluded as a corrosion acceleration test under a low-temperature and low-oxidative condition. Since sample No. 1-101 was severely worn, an amount of wear (%) at the time when the total period of time reached nine hours was determined.

A value shown in Table 3 shows a result of a soft material greater in value of a specific resistance, a thickness of the oxide film (a total thickness), and an average crystal grain size and a result of evaluation of corrosion resistance of a soft material greater in amount of decrease, among results of measurement of the soft materials of the round wires and the soft materials of the flat wires adopted as the electrode materials of the samples.

TABLE 3

| Sample No. | Auxiliary Element | Specific Resistance μΩ · cm | Spark Wear Resistance | State of Formation of Oxide Film 900° C. × 100 H | | | Average Crystal Grain Size μm | Corrosion Resistance 800° C. × 24 H | Engine Test 90 H Amount of Wear |
|---|---|---|---|---|---|---|---|---|---|
| | | | | Oxide Film Thickness | | | | | |
| | | | | Surface μm | Inside μm | Surface/Inside | | | |
| 1-1 | Ir | 12 | A | 28 | 25 | 1.12 | 60 | B | — |
| 1-2 | Zr | 12 | A | 30 | 23 | 1.30 | 62 | B | — |
| 1-3 | Sb | 12 | A | 28 | 25 | 1.12 | 58 | B | — |

TABLE 3-continued

| Sample No. | Auxiliary Element | Specific Resistance μΩ·cm | Spark Wear Resistance | State of Formation of Oxide Film 900° C. × 100 H Oxide Film Thickness | | | Average Crystal Grain Size μm | Corrosion Resistance 800° C. × 24 H | Engine Test 90 H Amount of Wear |
|---|---|---|---|---|---|---|---|---|---|
| | | | | Surface μm | Inside μm | Surface/Inside | | | |
| 1-4 | Yb | 12 | A | 32 | 28 | 1.14 | 60 | B | — |
| 1-5 | Yb | 14 | A | 66 | 66 | 1.00 | 59 | A⁺ | 5% |
| 1-6 | Yb | 14 | A | 60 | 50 | 1.20 | 40 | A | — |
| 1-7 | Yb | 15 | A | 66 | 72 | 0.92 | 62 | A⁺ | 2% |
| 1-8 | Yb | 15 | A | 60 | 55 | 1.09 | 65 | A | — |
| 1-9 | Hf | 12 | A | 29 | 24 | 1.21 | 60 | B | — |
| 1-10 | Nb | 12 | A | 30 | 24 | 1.25 | 61 | B | — |
| 1-101 | — | 13 | A | 52 | 22 | 2.36 | 90 | C | 25% (9 H) |
| 1-102 | — | 14 | A | 50 | 22 | 2.27 | 88 | C | — |
| 1-103 | — | 14 | A | 50 | 22 | 2.27 | 92 | C | — |
| 1-104 | — | 15 | A | 47 | 27 | 1.74 | 100 | C | — |
| 1-105 | — | 16 | B | 47 | 27 | 1.74 | 98 | C | — |
| 1-106 | — | 17 | B | 63 | 40 | 1.58 | 110 | B | — |
| 1-107 | Ce | 12 | A | 51 | 23 | 2.22 | 88 | C | — |

As shown in Table 3, it can be seen that samples Nos. 1-1 to 1-10 composed of Y, Si, Cr, Ti, and a specific auxiliary element and a specific composition containing Mn and Al within a specific range as appropriate are less likely to be corroded by the corrosive liquid and high in corrosion resistance even when they are held for a long period of time in a relatively low-temperature and low-oxidative atmosphere around 800° C. Specifically, samples Nos. 1-1 to 1-10 achieved evaluation of corrosion resistance as A⁺, A, and B and were small in amount of decrease described above. It can be seen in particular that, when Yb is contained as a specific auxiliary element, the amount of decrease is very small and higher corrosion resistance is achieved. It can be seen that an amount of wear is also 5% or lower in the engine test and very high corrosion resistance is achieved when Yb is contained. The samples containing other specific auxiliary elements are also higher in evaluation of corrosion resistance than sample No. 1-101 and hence they are expected to be smaller in amount of wear (for example, approximately 10% or lower) also in the engine test.

One of reasons why samples Nos. 1-1 to 1-10 were high in corrosion resistance may be that Y could exist as being more uniformly dispersed by containing a specific auxiliary element and crystal grains could be finer. This is also supported by the fact that samples Nos. 1-1 to 1-10 each containing a specific auxiliary element are smaller in average crystal grain size than samples Nos. 1-101 to 1-107 containing no specific auxiliary element. In this test, samples Nos. 1-1 to 1-10 have an average crystal grain size not greater than 65 μm and there is also a sample which has an average crystal grain size not greater than 50 μm. Though sample No. 1-107 contains Ce which totally forms a solid solution with Y, it is greater in crystal grain than samples Nos. 1-1 to 1-10. Therefore, it can be concluded that an element which forms a compound or a eutectic with Y is preferred as an element which enhances an effect of refinement of Y, rather than an element which totally forms a solid solution with Y.

Another reason why samples Nos. 1-1 to 1-10 are high in corrosion resistance may be that, with a specific composition, an appropriate oxide film, for example, an oxide film which satisfies a thickness ratio lower than 1.5, could be formed. In this test, the internal oxide layer of each of samples Nos. 1-1 to 1-10 was relatively small in thickness and the surface oxide layer substantially equal in thickness thereto was present (a thickness ratio being not lower than 0.9 and not higher than 1.3). Therefore, it is considered that the oxide film as a whole was not excessively large in thickness, a crack was less likely, a sound oxide film could satisfactorily be present, and the oxide film could suppress introduction of a corrosive liquid into the inside. It is further considered that the sound oxide film was readily maintained also because an amount of Si was within an appropriate range and Si/Cr was within an appropriate range so that an oxide film which was dense and excellent in adhesiveness was formed.

It can further be seen that samples Nos. 1-1 to 1-10 were low in specific resistance not higher than 15μΩ·cm and excellent in spark wear resistance. When an amount of Si is increased as in sample No. 1-106, excellent corrosion resistance is achieved (evaluation of corrosion resistance being B) whereas a specific resistance increases. When an amount of Si is decreased to some extent (not higher than 0.8 mass %), by containing a specific auxiliary element within a specific range, excellent corrosion resistance is achieved, a specific resistance is low, and spark wear resistance is also excellent. This is supported by samples Nos. 1-1 to 1-4, 1-9, and 1-10 which are small in amount of Si. As shown with samples Nos. 1-5 to 1-8, it can be seen that higher corrosion resistance is achieved by containing Si in an amount large to some extent and containing a specific auxiliary element.

It was confirmed from the results of the test that the electrode material composed of Y, Si, Cr, Ti, and a specific auxiliary element and a specific composition containing Mn and Al within a specific range as appropriate was suitable for a material for an electrode for an ignition plug high in corrosion resistance in a relatively low-temperature and low-oxidative atmosphere. It is expected that an electrode for an ignition plug and an ignition plug equipped with the electrode for the ignition plug made of the electrode material are high in corrosion resistance in a relatively low-temperature and low-oxidative atmosphere.

The present invention is defined by the terms of the claims without being limited to the exemplifications and is intended to include any modifications within the scope and meaning equivalent to the terms of the claims. For example, a composition, a shape, and a size of the electrode material or the electrode shown in the first test example can be modified as appropriate. The ground electrode and the central electrode can be different in composition from each other.

The electrode material in the present invention can be made use of as a material for an electrode equipped in an ignition plug in an engine or the like of a car such as a four-wheel vehicle and a two-wheel vehicle. The electrode for the ignition plug in the present invention can be made use of as a component of the ignition plug. The ignition plug in the present invention can be made use of as an ignition component of an engine or the like.

The invention claimed is:

1. An electrode material comprising:
   more than 0.3 mass % and at most 1.0 mass % of Y;
   at least 0 mass % and at most 0.2 mass % of Al;
   at least 0.2 mass % and at most 1.6 mass % of Si;
   at least 0.05 mass % and at most 1.0 mass % of Cr;
   at least 0.05 mass % and at most 0.5 mass % of Ti;
   at least 0.1 mass % and at most 0.5 mass % in total of one or more elements selected from among Yb, Sb, Ir, Zr, Hf, Pt, Re, Pd, Rh, Ru, Nb, V, W, Mo, and Ta; and
   a remainder composed of Ni and an inevitable impurity.

2. The electrode material according to claim 1, the electrode material further comprising at least 0.05 mass % and at most 0.5 mass % of Mn.

3. The electrode material according to claim 1, wherein when the electrode material is heated at 900° C. for 100 hours, the heated electrode material has an oxide film formed on a surface, and
   the oxide film has a two-layered structure of an internal oxide layer and a surface oxide layer and a ratio of a thickness of the surface oxide layer to a thickness of the internal oxide layer is lower than 1.5.

4. The electrode material according to claim 1, the electrode material comprising Yb.

5. The electrode material according to claim 1, the electrode material satisfying a condition of Si/Cr≥1.

6. The electrode material according to claim 1, the electrode material having a specific resistance at a room temperature not higher than 25 μΩ·cm.

7. The electrode material according to claim 1, wherein when the electrode material is heated at 900° C. for 100 hours, the heated electrode material has an average crystal grain size not greater than 80 μm.

8. An electrode for an ignition plug composed of the electrode material according to claim 1.

9. An ignition plug including the electrode for the ignition plug according to claim 8.

* * * * *